(12) United States Patent
Tavano et al.

(10) Patent No.: US 11,782,143 B2
(45) Date of Patent: Oct. 10, 2023

(54) LIGHT DETECTION AND RANGING SYSTEM AND METHOD FOR OPERATING A LIGHT DETECTION AND RANGING SYSTEM

(71) Applicant: Integrated Device Technology, Inc., San Jose, CA (US)

(72) Inventors: Giuseppe Tavano, Munich (DE); Dominik Gruber, Munich (DE); Serge Di Matteo, Biassono (IT)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 705 days.

(21) Appl. No.: 16/660,488

(22) Filed: Oct. 22, 2019

(65) Prior Publication Data

US 2020/0132821 A1    Apr. 30, 2020

Related U.S. Application Data

(60) Provisional application No. 62/753,627, filed on Oct. 31, 2018.

(51) Int. Cl.
*G01S 7/497* (2006.01)
*G01S 7/481* (2006.01)
*G01S 17/42* (2006.01)
*G01S 17/93* (2020.01)

(52) U.S. Cl.
CPC ........... *G01S 7/4972* (2013.01); *G01S 7/4811* (2013.01); *G01S 17/42* (2013.01); *G01S 17/93* (2013.01)

(58) Field of Classification Search
None
See application file for complete search history.

(56) References Cited

U.S. PATENT DOCUMENTS

2015/0204980 A1* 7/2015 Matsuura ............... B60W 30/08
356/4.01

FOREIGN PATENT DOCUMENTS

| DE | 19629713 A1 | 1/1998 |
|---|---|---|
| DE | 9321459 U1 | 4/1998 |

OTHER PUBLICATIONS

European Search Report dated Feb. 17, 2020 issued in related European patent app. No. 19199963.0 (10 pages).

* cited by examiner

*Primary Examiner* — Kaitlin A Retallick
(74) *Attorney, Agent, or Firm* — HAYNES AND BOONE, LLP

(57) ABSTRACT

A light detection and ranging system is presented that includes at least one light source for emitting a light pulse to the surroundings of the light detection and ranging system, at least one monitoring optical sensor for monitoring the emitting of the light pulse by the at least one light source, at least one receiving optical sensor for receiving a light signal from the surroundings of the light detection and ranging system, and at least one signal processing unit for processing the signal of the at least one receiving optical sensor which is characterized in that the at least one signal processing unit comprises a multiplexer at the input for multiplexing between the signal of the at least one receiving optical sensor and the signal of the at least one monitoring optical sensor.

13 Claims, 1 Drawing Sheet

LIGHT DETECTION AND RANGING SYSTEM AND METHOD FOR OPERATING A LIGHT DETECTION AND RANGING SYSTEM

PRIORITY APPLICATIONS

This application claims priority to U.S. Provisional Patent Application No. 62/753,627, filed on Oct. 31, 2018, which is incorporated by reference in its entirety.

TECHNICAL FIELD

The invention relates to a light detection and ranging system. The invention further relates to a method for operating a light detection and ranging system.

DISCUSSION OF RELATED ART

Light detection and ranging (Lidar) systems, also called laser detection and ranging (Ladar) systems, measure the distance to a target by illuminating the target with pulsed laser light and measuring the reflected pulses with an optical sensor. Differences in laser return times and wavelength can then be used to make 3-D representations of the target. Lidar systems have become popular in automotive applications, for example in advanced safety systems. A lidar system is, for example, used to scan the surroundings of a car to detect any obstacles on a collision course with the car and issue a warning to the driver and/or to initiate an emergency brake. Lidar systems are often used in autonomous cars for controlling and navigation purposes. In such automotive applications it is essential that the Lidar systems is highly available and precise with a minimum of detection errors.

The emitting system of the light detection and ranging system comprises a light source, particularly a laser source like a laser diode, for emitting the light signal to the surroundings of the light detection and ranging system.

This emitting light signal is reflected or scattered by objects in the surroundings of the light detection and ranging system.

The optical receiver system of the light detection and ranging system usually comprises or is connected to a string of optical sensors, which are for example arranged in the front part of an automobile. For example, the optical receiver system is arranged inside the automobile and connected to the string of optical sensors via a cable. The optical receiver system comprises at least one optical receiver channel, which is connectable to a respective optical sensor. Usually the optical receiver system comprises a separate optical receiver channel for each optical sensor.

The optical receiver system amplifies the signal of the optical sensor before processing the optical sensor signal. The amplified optical sensor signal is usually converted from the analog domain to the digital domain by an analog-to-digital converter and afterwards being processed by a digital signal processor. Therefore, each optical receiver channel comprises a separate amplifier system for amplifying the respective optical sensor signals.

High performance Lidar systems, as used in autonomous cars for controlling and navigation purposes, must be highly available with a minimum of detection errors. Particularly, the functioning of the light detection and ranging system must be regularly checked.

From the prior art it is known to check the functioning of the light emitting system by using a monitoring optical sensor associated to the light source. The monitoring optical sensor detects the emitted light signal and forwards a corresponding signal to a separate signal processing unit. This signal processing unit compares the signal detected by the monitoring optical sensor to an expected result and thereby checks the emitting of the light signal.

However, the functioning of the optical receiver system, particularly of the multiple receiver channels, is not checked during the operation of the light detection and ranging system.

SUMMARY

It is therefore an object of the present invention to provide a light detection and ranging system which is highly available and provides self-check functions for the light emitting system and the optical receiver system.

The object is solved by a light detection and ranging system including at least one light source for emitting a light signal to the surroundings of the light detection and ranging system, at least one monitoring optical sensor for monitoring the emitting of the light signal by the at least one light source, at least one receiving optical sensor for receiving a light signal from the surroundings of the light detection and ranging system, and at least one signal processing unit for the signal of the at least one receiving optical sensor, which is characterized in that the at least one signal processing unit comprises a multiplexer at the input for multiplexing between the signal of the at least one receiving optical sensor and the signal of the at least one monitoring optical sensor.

According some embodiments of the invention the at least one signal processing unit can switch between the signal of the at least one receiving optical sensor and the signal of the at least one monitoring optical sensor. Thus, in the first variant the signal processing unit processes the signal of the at least one receiving optical sensor, which is used to detect objects in the surroundings of the light detection and ranging system. In the second variant the signal processing unit processes the signal of the at least one monitoring optical sensor, which can be compared to an expected signal. If the processed signal of the monitoring optical sensor differs from the expected signal the light detection and ranging system can issue a warning to a user or other systems using the signals of the light detection and ranging system. The difference can be due to a problem with the light source or the signal processing unit. Thus, the light detection and ranging system provides a self-check function for the at least one light source and the signal processing unit. Furthermore, compared to the prior art no additional signal processing unit for the monitoring optical sensor is necessary, which has been replaced by a multiplexer in the at least one signal processing unit for the at least one receiving optical sensor. A multiplexer is less complex than a signal processing unit and requires e.g. less power or die area.

The emitted light signal is preferably a light pulse, particularly a laser pulse.

Usually the light detection and ranging system comprises one light source and one corresponding monitoring optical sensor. If the light detection and ranging system comprises multiple light sources it preferably comprises a separate monitoring optical sensor for each light source.

In some embodiments of the invention the light source is a laser diode. The monitoring optical sensor and/or the receiving optical sensor can be for example a photodiode.

According to some embodiments of the invention the at least one light source and the at least one monitoring optical sensor are integrated in a single unit. This has the advantage that the at least one monitoring optical sensor can detect a nearly undisturbed light signal of the at least one light source, which improves the accuracy of the self-check for the at least one light source.

Pursuant to some embodiments of the invention the light detection and ranging system comprises multiple receiving optical sensors. These multiple receiving optical sensors are also referred to as optical receiver channels, particularly in combination with corresponding signal processing units. The multiple receiving optical sensors increase the accuracy of the light detection and ranging system and further allows a better object recognition because it is possible to detect the incident angle of the received light signal.

In some embodiments of the invention the light detection and ranging system comprises a separate signal processing unit for each receiving optical sensors, wherein each signal processing unit preferably comprises a separate multiplexer. This has the advantage that the light detection and ranging system can distinguish between errors of the at least one light source and errors of the signal processing units. This is done by processing the signal of the monitoring optical sensor by different signal processing units. If all signal processing units indicate the same error this is due to an error of the at least one light source. If only a one or a few of the signal processing units indicate an error this is due to an error of the respective signal processing unit. Preferably, the signal of the at least one monitoring optical sensor is sequentially processed by different signal processing units. This has the advantage that only the signal of one receiving optical sensor is replaced by the signal of the at least one monitoring optical sensor, so that the light detection and ranging system is still functioning. Since the signal of the at least one monitoring optical sensor is sequentially processed by the different signal processing units it is possible to provide the above advantage.

According to some embodiments of the invention the at least one signal processing unit comprises an amplifier, preferably a transimpedance amplifier.

Pursuant to some embodiments of the invention the at least one signal processing unit comprises an analog-to-digital converter for converting the analog signal of the at least one receiving optical sensor or the at least one monitoring optical sensor from the analog domain to the digital domain. This simplifies the further processing of the signals of the receiving optical sensors or the monitoring optical sensor.

In some embodiments of the invention the light detection and ranging system further comprises a microprocessor for processing the converted signal of the at least one receiving optical sensor or the at least one monitoring optical sensor. The microprocessor can for example process the signal of the receiving optical sensor for detecting objects in the surroundings of the light detection and ranging system by determining the flight time of the light signal emitted from the light source until receiving the reflected and/or scattered light signal. By using multiple receiving optical sensors it is also possible to determine the incident angle of the received light signal and to determine e.g. the size or shape of the object in the surroundings of the light detection and ranging system. The microprocessor can further compare the signal of the monitoring optical sensor with the expected signal of the monitoring optical sensor to check the functioning of the light source.

According to some embodiments of the invention the light detection and ranging system further comprises a control unit for controlling the at least one light source, the at least one monitoring optical sensor, the at least one receiving optical sensor and the at least one signal processing unit including the multiplexer. The control unit is particularly responsible for the timing of the light detection and ranging system, i.e. initiating the emitting of the light signal to the surroundings of the light detection and ranging system and the receiving of the light signals. The timing information is e.g. used to determine the time of flight of the light signal. The microprocessor and the control unit can be built integrally.

The object is further solved by a method for operating a light detection and ranging system that includes emitting a light signal to the surroundings of the light detection and ranging system, monitoring the emitting of the light signal using a monitoring optical sensor, receiving a light signal from the surroundings of the light detection and ranging system using a receiving optical sensor, processing the signal of the receiving optical sensor or the monitoring optical sensor by a signal processing unit, which is characterized in that the method comprises the step of multiplexing between the signal of the receiving optical sensor and the signal of the monitoring optical sensor for the processing step.

The method according to some embodiments the invention switches between the processing of the signal of the receiving optical sensor and the monitoring optical sensor. The signal of the receiving optical sensor is used to detect objects in the surroundings of the light detection and ranging system. This is performed e.g. by calculating the time of flight of the emitted and reflected/scattered light signal. The signal of the monitoring optical sensor is used to test the functioning of the light source and the signal processing unit. This is done by comparing the result of the processed signal of the monitoring optical sensor with an expected result. Thus, the method comprises the step of comparing the processed signal of monitoring optical sensor with an expected signal, i.e. result, to check the operation of the light source and/or signal processing unit. Since the emitted light signal is known, the result of the monitoring optical sensor can be determined/expected because the monitoring optical sensor directly receives the light signal of the light source and not any reflected or scattered light signal. If the processed signal differs from the expected signal there is an error in the light source and/or the signal processing unit.

In some embodiments of the invention the light signal of the surroundings is received by multiple receiving optical sensors. Preferably, the signal of each receiving optical sensor is separately processed by a signal processing unit and for each receiving optical sensor the step of multiplexing is or can be executed. Thus, according to the inventive method the reflected and/or scattered light signal is received by multiple receiving optical sensors. The signals of these receiving optical sensors is processed by separate signal processing units. Each signal processing unit can switch between the signal of the corresponding receiving optical sensor and the monitoring optical sensor. Since the signal of the monitoring optical sensor can be processed by different signal processing units the method can differentiate between errors of the light source and the signal processing units because in case of an error of the light source all signal processing units indicate the same difference to the expected signal and in case of an error in the signal processing unit only the respective signal processing unit relating to the error will indicate a difference to the expected signal.

Pursuant to some embodiments of the invention the signal of the monitoring optical sensor is sequentially processed by the multiple signal processing units. This can be done during normal operation of the light detection and ranging system without negatively affecting the operation because only one of the multiple signal processing units is processing the signal of the monitoring optical sensor instead of the signal of the corresponding receiving optical sensor.

In some embodiments of the invention the step of processing the signal of the receiving optical sensor or the monitoring optical sensor comprises the step of amplifying the signal and/or of converting the signal from the analog domain to the digital domain.

According to some embodiments of the invention the method comprises the step of controlling the light detection and ranging system, particularly of controlling the emitting of the light signal, the monitoring of the emitting of the light signal, the receiving of the reflected and/or scattered light, and/or the processing of the signal of the receiving optical sensor and monitoring optical sensor.

BRIEF DESCRIPTION OF THE FIGURES

In the following embodiments of the invention will be further explained with respect to the the figures. It shows.

DETAILED DESCRIPTION

Figure 1:
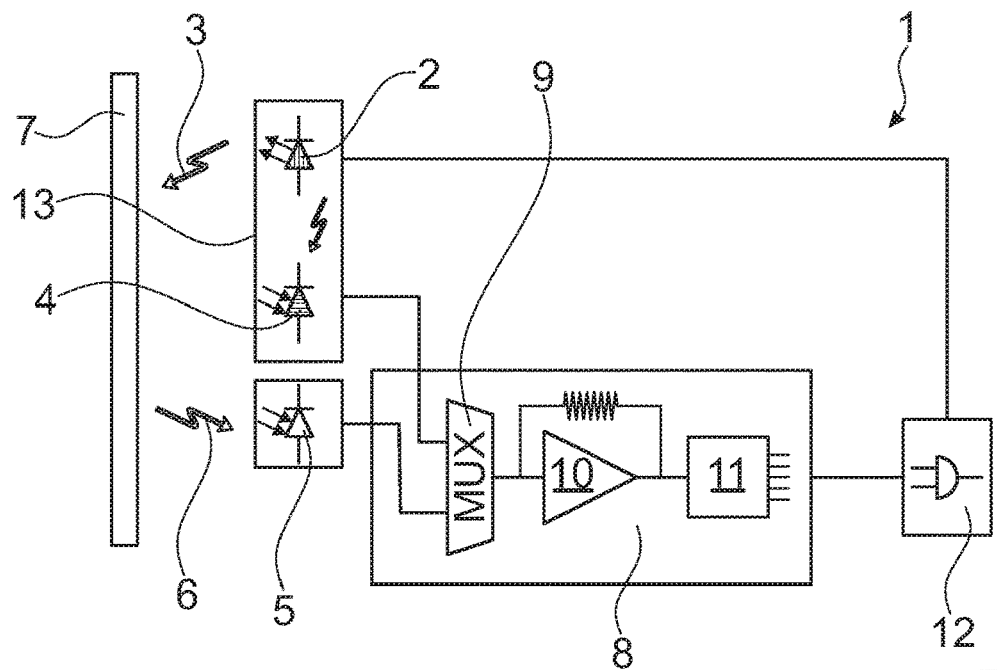
FIG. 1 a block diagram of a first embodiment of a light detection and ranging system according to the invention, and FIG. 2 a block diagram of a second embodiment of a light detection and ranging system according to the invention.

FIG. 1 shows a block diagram of a first embodiment of a light detection and ranging system 1 according to some embodiments of the invention.

The light detection and ranging system 1 of FIG. 1 comprises a light source 2 for emitting a light signal 3 to the surroundings of the light detection and ranging system 1. The light source 2 is for example a laser diode and the emitted light signal 3 is a laser pulse.

The light detection and ranging system 1 further comprises a monitoring optical sensor 4 for monitoring the emitting of the light signal 3 by the light source 2. The monitoring optical sensor 4 is for example a photodiode. According to the embodiment of FIG. 1 the light source 2 and the monitoring optical sensor 4 are integrated in a single unit 13, as indicated by box 13. Thus, the emitted light signal 3 can be directly received by the monitoring optical sensor 4 without disturbances of the environment.

The light detection and ranging system 1 of FIG. 1 further comprises a receiving optical sensor 5 for receiving a light signal 6 from the surroundings of the light detection and ranging system 1. The receiving optical sensor 5 is for example a photodiode. Since the light detection and ranging system 1 of FIG. 1 only comprises a single receiving optical sensor 5 it is referred to as single-channel light detection and ranging system 1.

The received light signal 6 corresponds to the emitted light signal 3, which has been reflected and/or scattered by an object 7 in the surroundings of the light detection and ranging system 1. By determining the time of flight of the emitted light signal 3 and the received light signal 6 the light detection and ranging system 1 can measure the distance to the object 7.

The light detection and ranging system 1 further comprises a signal processing unit 8 for processing the signal of the receiving optical sensor 5. According to the invention the signal processing unit 8 comprises a multiplexer 9 at the input for multiplexing between the signal of the receiving optical sensor 5 and the signal of the monitoring optical sensor 4. The signal processing unit 8 further comprises an amplifier 10 for amplifying the signal of the receiving optical sensor 5 or the monitoring optical sensor 4 and an analog-to-digital converter 11 for converting the amplified signal from the analog domain to the digital domain.

The light detection and ranging system 1 further comprises a microprocessor 12 for processing the signal of the receiving optical sensor 5 or the monitoring optical sensor 5. The microprocessor 12 for example determines the time of flight of the emitted light signal 3 and the received light signal 6 for object 7 detection. The microprocessor can also compare the processed signal of the monitoring optical sensor 4 with an expected result to detect errors in the light emitting and signal processing.

According to the embodiment of FIG. 1 the microprocessor 12 also acts as control unit 12 for the light detection and ranging system 1. The control unit 12 controls the light source 2, the monitoring optical sensor 4, the receiving optical sensor 5 and the signal processing unit 8 including multiplexer 9. However, it is also possible that the control unit 12 is an independent component of the light detection and ranging system 1.

The light detection and ranging system 1 emits a light signal 3 to the surroundings of the light detection and ranging system 1 using light source 2. Simultaneously the light detection and ranging system 1 monitors the emitting of the light signal 3 using the monitoring optical sensor 4, which is arranged in a single unit 13 with light source 2 to minimize outside disturbances.

The emitted light signal 3 is reflected and/or scattered by object 7 in the surroundings of the light detection and ranging system 1. The reflected and/or scattered light signal 6 is received by the light detection and ranging system 1 using the receiving optical sensor 5.

The signal of the receiving optical sensor 5 and the monitoring optical sensor 4 is processed by a signal processing unit 8. The signal processing unit 8 can multiplex between the signal of the receiving optical sensor 5 and the monitoring optical sensor 4 using multiplexer 9 of the signal processing unit 8. By processing the signal of the monitoring optical sensor 4 and comparing the result with an expected result the light detection and ranging system 1 can detect errors in the light emitting and signal processing. By processing the signal of the receiving optical sensor 5 and determining the time of flight of the emitted light signal 3 and the received light signal 6 the light detection and ranging system 1 can detect objects in the surroundings and the distance to the object 7.

The signal of the receiving optical sensor 5 respectively of the monitoring optical sensor 4 is amplified by the signal processing unit and afterwards converted from the analog domain to the digital domain.

Figure 2:
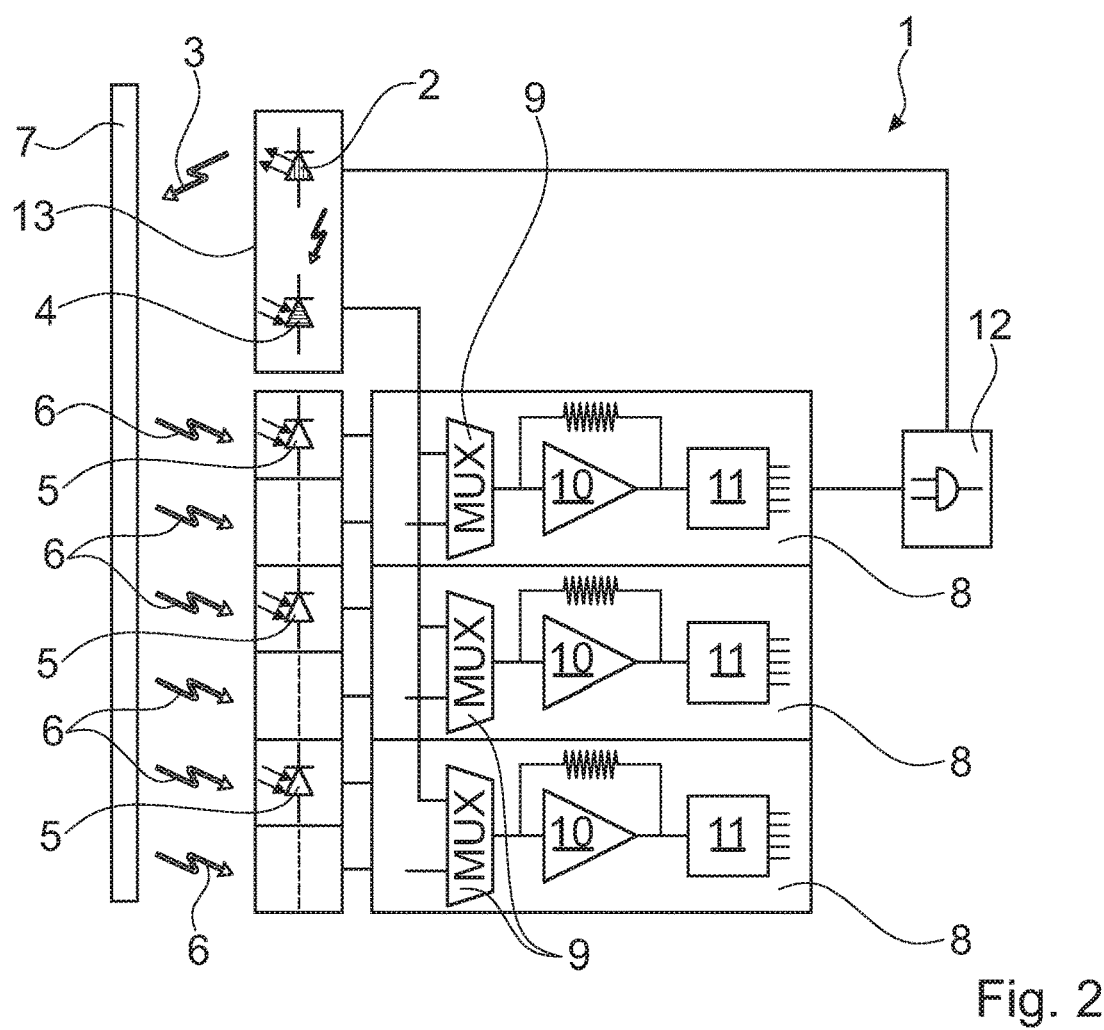

FIG. 2 shows a block diagram of a second embodiment of a light detection and ranging system 1 according to the invention.

The second embodiment of FIG. 2 differs from the first embodiment of FIG. 1 in that the light detection and ranging system 1 comprises multiple receiving optical sensors 5 and separate signal processing units 8 for each receiving optical sensor 5. Each signal processing unit 8 comprises a separate multiplexer 9 for multiplexing between the signal of the corresponding receiving optical sensor 5 and the monitoring optical sensor 4.

Since the light detection and ranging system 1 of FIG. 2 comprises multiple receiving optical sensors 5 it is referred to as multi-channel light detection and ranging system 1.

The reflected light signal 6 is received by the multiple receiving optical sensors 5. Since the time of flight for the emitted light signal 3 and the received light signals 6 differs for each receiving optical sensor 5 the light detection and ranging system 1 can for example additionally determine the incident angle of the received light signal 6 or other features.

Each signal processing unit 8 processed the signal of the corresponding receiving optical sensor 5 or the monitoring optical sensor 4. Therefore, each signal processing unit 8 comprises a separate multiplexer 9. Preferably, the separate signal processing units 8 sequentially process the signal of the monitoring optical sensor 4, i.e. for each emitted light signal 3 the corresponding signal of the monitoring optical sensor 4 is only processed by a single signal processing unit 8 and all other signal processing units 8 process the signal of the corresponding receiving optical sensor 5. For the next emitted light signal 3 the signal of the monitoring optical sensor 4 is processed by another, i.e. the next in the sequence, signal processing unit 8. In this way the functioning of the light detection and ranging system 1 is not interrupted.

Since the signal of the monitoring optical sensor 4 is processed by different signal processing units 8 it is possible to distinguish between errors of the light source 3 and the signal processing units 8. If all signal processing units 8 cause/indicate the same error during processing of the signal of the monitoring optical sensor 4 there is an error with the light source 2. If only one signal processing unit 8 causes/indicates an error, this signal processing unit 8 is causing the error.

LIST OF REFERENCE NUMERALS

1 light detection and ranging system
2 light source
3 emitted light signal
4 monitoring optical sensor
5 receiving optical sensor
6 light signal surroundings
7 object
8 signal processing unit
9 multiplexer
10 amplifier
11 analog-to-digital converter
12 microprocessor/control unit
13 single light emitting unit

What is claimed is:

1. A light detection and ranging system comprising:
   at least one light source for emitting a light pulse to the surroundings of the light detection and ranging system,
   at least one a monitoring optical sensor for monitoring the light pulse emitted by the at least one light source, wherein each of the at least one monitoring optical sensor is associated with a corresponding one of the at least one light source and provides a monitor signal related to the light pulse;
   at least one receiving optical sensor for receiving a light signal from the surroundings of the light detection and ranging system, each of the at least one receiving optical sensor providing a sensor signal related to the light signal; and
   at least one signal processing unit for processing the sensor signal of the at least one receiving optical sensor, wherein each of the at least one signal processing unit receives the sensor signal from an associated one of the at least one receiving optical sensor,
   wherein each of the at least one signal processing unit comprises a multiplexer at the input configured to multiplex between the sensor signal of the one of the at least one receiving optical sensor that is associated with the signal processing unit and the monitor signal of at least one monitoring optical sensor,
   wherein each sensor signal from each of the at least one receiving optical sensors is processed in a separate signal processing unit of the at least one signal processing unit and each sensor signal is separately multiplexed with the monitor signal in the multiplexor of the separate signal processing unit.

2. The light detection and ranging system according to claim 1, wherein the at least one light source and the associated at least one monitoring optical sensor are integrated in a single unit.

3. The light detection and ranging system according to claim 1, wherein the at least one receiving optical sensor of the light detection and ranging system comprises multiple receiving optical sensors.

4. The light detection and ranging system according to claim 1, wherein each of the at least one signal processing unit comprises an amplifier, preferably a transimpedance amplifier, coupled to the multiplexer.

5. The light detection and ranging system according to claim 1, wherein each of the at least one signal processing unit comprises an analog-to-digital converter for converting an analog signal of the sensor signal from the at least one receiving optical sensor or the monitor signal of the at least one monitoring optical sensor from an analog domain to a digital domain.

6. The light detection and ranging system according to claim 1, further comprising a microprocessor coupled to the at least one signal processing unit for processing the signal of the at least one receiving optical sensor of the at least one monitoring optical sensor.

7. The light detection and ranging system according to claim 1, further comprising a control unit for controlling the at least one light source, the at least one monitoring optical sensor, the at least one receiving optical sensor and the at least one signal processing unit including the multiplexer.

8. A method for operating a light detection and ranging system comprising:
   emitting a light signal to the surroundings of the light detection and ranging system,
   monitoring the emitting of the light signal using a monitoring optical sensor to provide a monitor signal,
   receiving a light signal from the surroundings of the light detection and ranging system using a receiving optical sensor to provide a sensor signal, and
   processing the sensor signal of the receiving optical sensor or the monitoring signal from the monitoring optical sensor by a signal processing unit,
   wherein processing the sensor signal includes multiplexing between the sensor signal of the receiving optical sensor and the monitor signal of the monitoring optical sensor, the multiplexing includes selecting between a single sensor signal and a single monitor signal such that one of the sensor signal or the monitor signal is selected,
   wherein the signal processing unit that processes the sensor signal is separate from an other processing unit that receives an other sensor signal, the other processing unit receives the other sensor signal and multiplexes it with the monitor signal so that the other sensor signal or the monitor signal is processed.

9. The method of claim 8, wherein the light signal from the surroundings of the light detection and ranging system is received by multiple receiving optical sensors to produce multiple sensor signals.

10. The method of claim 9, wherein the sensor signal of each receiving optical sensor is separately processed by a signal processing unit and for each receiving optical sensor the step of multiplexing is executed.

11. The method of claim 10, wherein the monitoring signal of the monitoring optical sensor is processed by each of the multiple signal processing units.

12. The method of claim 8, wherein the step of processing the sensor signal of the receiving optical sensor or the monitoring signal of the monitoring optical sensor comprises the step of amplifying the signal and/or of converting the signal from an analog domain to a digital domain.

13. The method according to claim 8, further comprising the step of controlling the light detection and ranging system, particularly controlling the emitting of the light signal, the monitoring of the emitting of the light signal, the receiving of the light signal from the surroundings of the light detection and ranging system, and the processing of the sensor signal of the receiving optical sensor or the monitoring signal of the monitoring optical sensor including the step of multiplexing.

* * * * *